United States Patent [19]

Hoffman et al.

[11] Patent Number: 4,566,552

[45] Date of Patent: Jan. 28, 1986

[54] HOOD TILT RETARDATION SYSTEM

[75] Inventors: Lawrence A. Hoffman, Hoagland; Jay P. Hacker; William M. Miller, both of Fort Wayne, all of Ind.

[73] Assignee: International Harvester Company, Chicago, Ill.

[21] Appl. No.: 552,582

[22] Filed: Nov. 16, 1983

[51] Int. Cl.[4] ............................................ B62D 25/10

[52] U.S. Cl. ................................ 180/69.21; 180/89.17

[58] Field of Search ................. 180/69.2, 69.21, 89.14, 180/89.18, 89.17; 296/57 A; 292/338; 49/386

[56] References Cited

U.S. PATENT DOCUMENTS

| | | | |
|---|---|---|---|
| 3,017,944 | 1/1962 | Norrie | 180/69 |
| 3,157,240 | 11/1964 | Chew | 180/69 |
| 3,232,368 | 2/1966 | Sullivan | 180/69 |
| 3,419,099 | 12/1968 | Brumbaugh | 180/69 |
| 3,754,613 | 8/1973 | Stephans | 180/69 |
| 4,281,733 | 8/1981 | Miller | 180/69 |
| 4,359,119 | 11/1982 | Kammerman | 180/69.21 |

FOREIGN PATENT DOCUMENTS

| | | | |
|---|---|---|---|
| 684973 | 4/1964 | Canada | 296/64 |

OTHER PUBLICATIONS

The New Mack Super-Liner-Four (4) pages (Advertisment).

Peterbilt (Copies of Photos), 1 sheet.

Kenworth (Copies of Photos), 1 sheet.

Freightliner (Copies of Photos), 1 sheet.

*Primary Examiner*—Joseph F. Peters, Jr.

*Assistant Examiner*—Mark C. Dukes

*Attorney, Agent, or Firm*—Dennis K. Sullivan; F. David AuBuchon

[57] ABSTRACT

A hood tilt retardation system comprising a shock absorber mounted on the side of upstanding member near the motor truck engine provides cushioning of the hood descent into its fully open or closed positions in the final segments thereof. This cushioning is augmented by a pair of springs attached to the hood and upstanding member for movement thereabout and functioning as a counterbalance to the hood weight during the hood reciprocal movement between its open and closed positions.

12 Claims, 4 Drawing Figures

HOOD TILT RETARDATION SYSTEM

BACKGROUND OF THE INVENTION

Field of the Invention

This invention pertains to the hood tilt assist systems for motor vehicles, and more particularly to a system incorporating shock absorbers and springs.

INFORMATION DISCLOSURE STATEMENT

Heretofore, various hood tilt assist systems have been introduced which can be exemplified in the following patents. For instance, U.S. Pat. No. 3,754,613, issued to Stephens et al., discloses a spring assisting in the movement of a hood tilt. Another U.S. Pat. No. 4,281,733 discloses a hydraulic hood damper or dashpot which cushions only the hood opening.

However, none of the references of record illustrates or teaches the novel hood tilt retardation system cushioning the hood descent toward both its open and closed positions.

SUMMARY OF THE INVENTION

According the present invention, a hood tilt retardation system for a motor vehicle comprises an engine covering hood pivotally mounted at its front lower portion to a stationary part of the vehicle framework. Retardation means are secured to the vehicle upstanding means, which extend upwardly from a vehicle framework, and employed for a reciprocal speed reduction of the hood travel toward both its open and closed position during the final segments of the hood travel. Retardation means are equiangularly and equidistantly displaced in either direction for cushioning the hood descent.

DESCRIPTION OF THE PREFERRED EMBODIMENT

Figure 1:
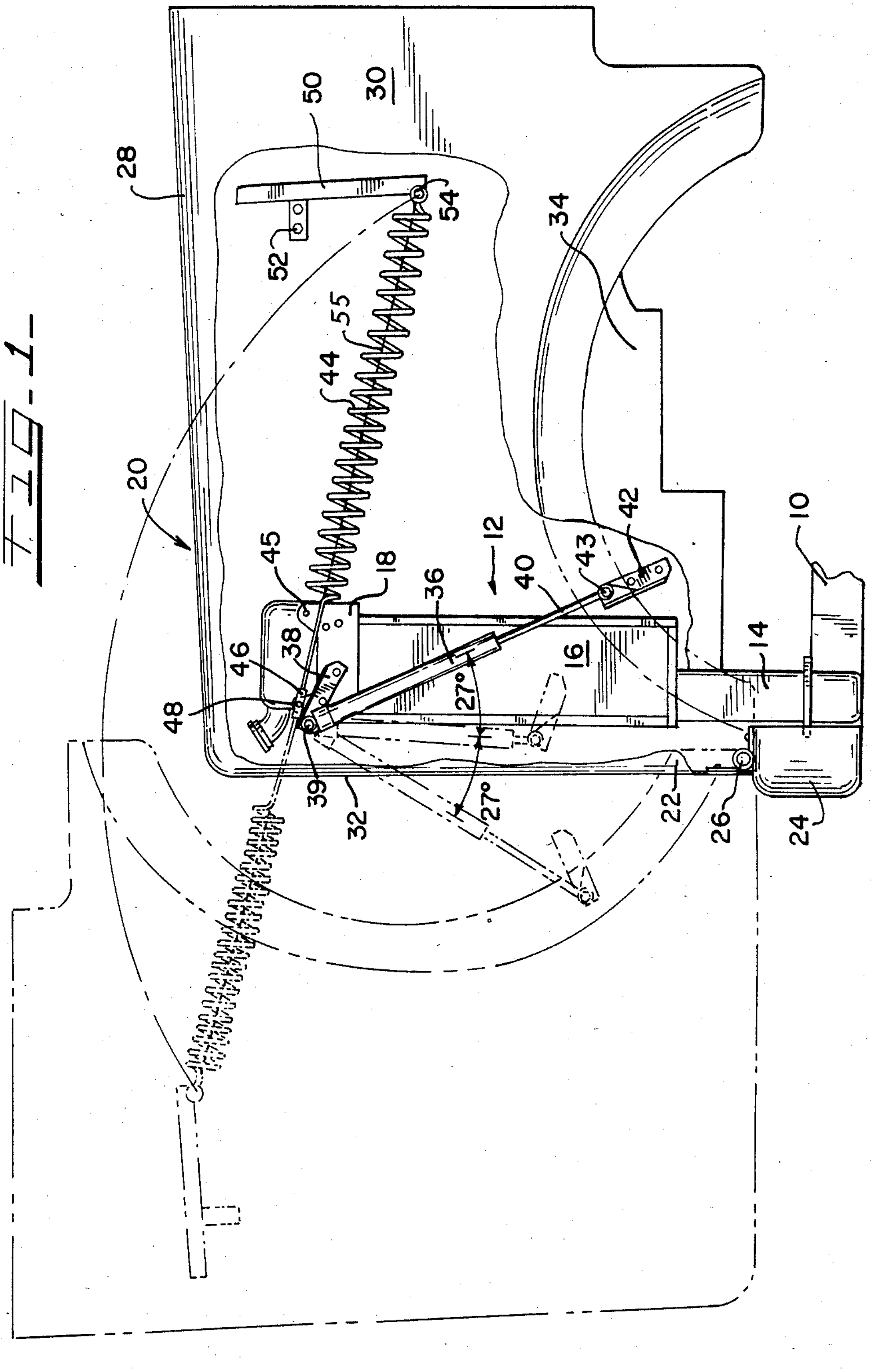
FIG. 1 is a side view of the hood tilt retardation system.

The invention may be carried into practice in a number of ways but one specific embodiment will be described by way of example only.

Referring now to the drawings wherein reference characters designate like or corresponding parts throughout the several views, as shown in FIGS. 1, 2, 3 and 4. A motor truck framework 10 (only a fragment thereof is shown) to which an upstanding means 12, which include a radiator 14, engine air intake 16, brackets 18 or the like structures, is attached. The framework 10 represents a stationary part of the motor truck. Behind the radiator 14 there is an engine block which is not shown in the drawings. An engine covering hood 20 is pivotally mounted at its front lower portion 22 on the framework 10 above by the hinges 26. The hood 20 reciprocably rotates about the hinges 26 between its fully open and closed positions. The hood 20 comprises the top panel 28, side wall structures 30 and front panel 32. Each of these side wall structures 30 includes a splash panel 34 extending inwardly therefrom and covering the truck tires (not shown).

Figure 2:
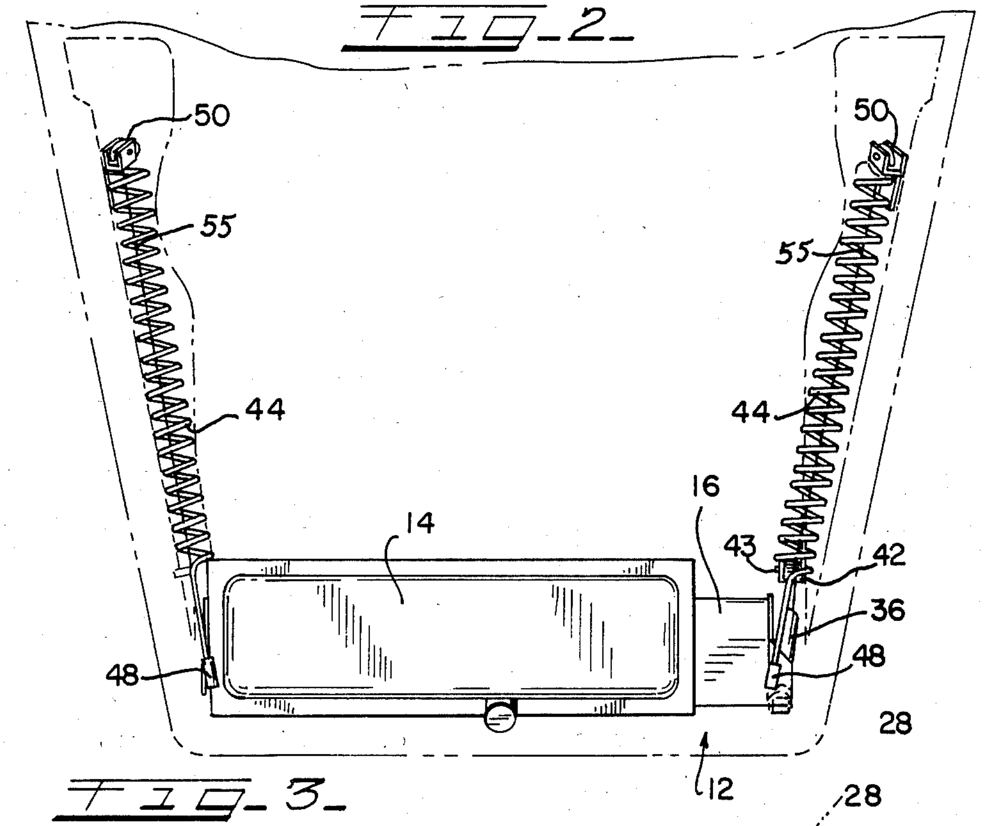
FIG. 2 is a top view of the system shown in FIG. 1.
Figure 3:
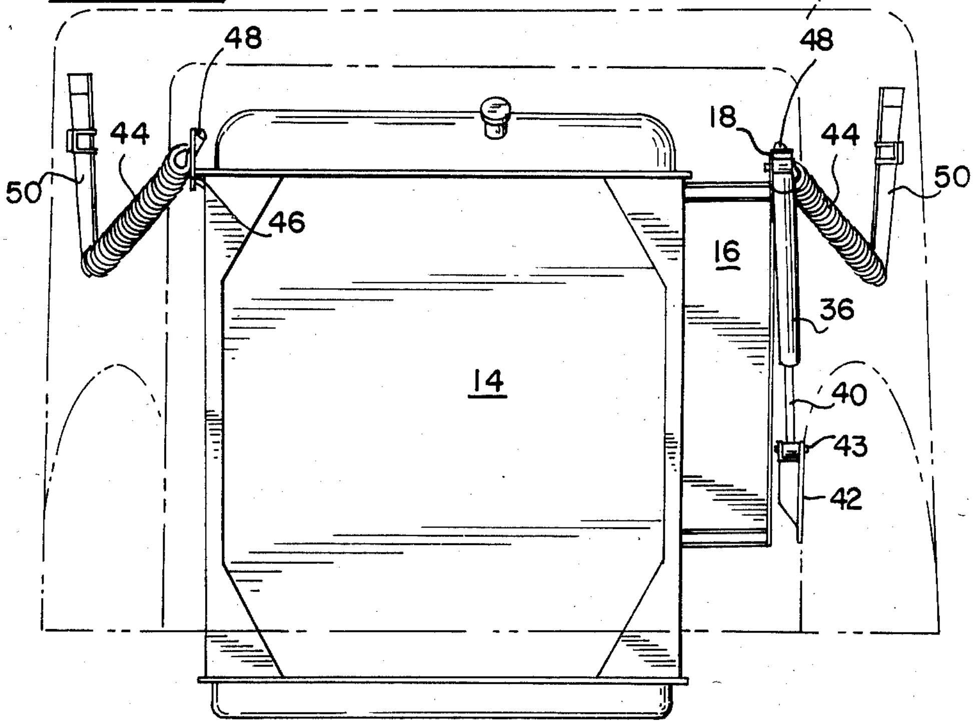
FIG. 3 is a front view of the system illustrated in FIG. 1.
Figure 4:
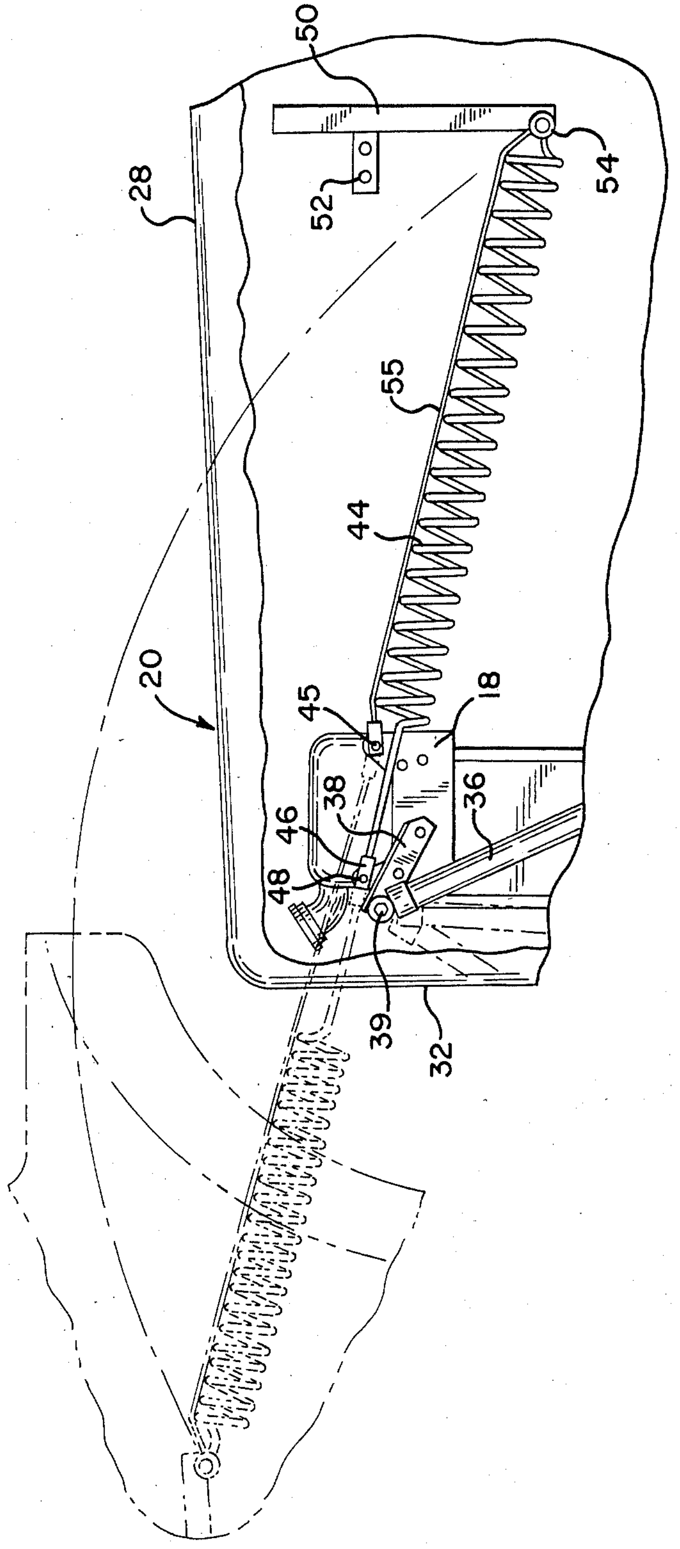
FIG. 4 is another embodiment of the stop cable location and attachment.

Opening and closing of the hood 20 is assisted by the hood tilt retardation means including a hydraulic damper or dashpot 36, which is pivotally attached to the bracket 18 by a mount bracket 38 at a pivot joint 39. The dashpot or shock absorber 36 has its piston rod 40 pivotally secured to the bracket 42 by a pivot joint 43 rigidly mounted on the splash panel 34. The dashpot 36 deviates (about 27°) in either direction from a hood vertical or over-center position to its position in the hood fully closed or open position. In addition to the retardation dashpot 36 a tension spring 44 is disposed on each side of the radiator 14. Each of the springs 44 is hooked up to a bracket 18, secured to the upstanding means 12, at the attachment point generally designated 48 and to the rearward portion of the hood 30 by a bracket 50 rigidly secured thereto. The point of attachment 52 to the hood 30 can be below or above (as shown in this embodiment) the point of attachment 48. Obviously the bracket 50 can be deleted and replaced by any element projecting inwardly from the hood 30 similar to a pin 54 of the bracket 50 retaining the spring 44. The stretched stop cables 55 limit the travel of the hood into its open position. A stop cable 55 can be disposed anywhere along the longitudinal axis of the spring 44, either inside or outside thereof. Each stop cable 55 is hooked to a point rearwardly of the spring attachment point. It can be hooked to the same attachment point as the spring itself (as shown in FIG. 2) or the separate lug attachment 45 (as shown in FIG. 4).

A motor truck hood opening or closing is assisted by a hood descent retardation device 36, such as the above discussed shock absorber or dashpot. The device 36 restricts the speed of travel of the hood 30 in the final segment thereof, while permitting an unrestrictred hood displacement prior to entering this final segment. The hood reaches this final stretch of its path after passing its over-center position (the center of gravity of the hood is in a vertical plane with the hinges 26) in either direction. The absorber 36 compression correlates to the unrestricted hood travel and peaks in the hood over-center position. The shock absorber 36 lowers the speed of travel only in the final segments of the hood descent path by extending its piston rod 40.

The lower end of the hydraulic damping device 36 deviates roughly to the same degree (approximately 27°) and advances about the same distance between its positions corresponding to the hood over-center position and fully closed or open positions.

A pair of tension springs moves above the upstanding means with the hood and urges the hood to move in a direction opposite to the direction of the hood descent, thereby counterbalancing the hood weight in its travel in either direction. This counterbalancing augments the cushioning effect of the retardation means.

While one embodiment of the invention has been illustrated and described herein, various changes and modifications may be made therein without departing from the spirit of the invention as defined by the scope of the appended claims.

What is claimed is:

1. A hood tilt assist system for a motor vehicle including a supporting framework, said system comprising:

an engine covering hood pivotally mounted at its front lower portion to an immobilized part of said framework and reciprocably moveable through a hood-over-center position between open and closed positions;

stop means operatively associated with said hood to stop the travel of said hood and defining respectively said open and closed positions;

upstanding means rigidly attached to and extending upwardly from said framework to a level disposed substantially above the lowest portion of said hood in both its open and closed positions;

dashpot retardation means secured to said upstanding means and said hood for reducing the speed of hood travel toward both said open and said closed positions, said retardation means being operative between said hood-over-center position and said open and closed positions defined by said stop means, said retardation means providing an unrestricted displacement of said hood prior to said hood passing said hood-over-center position; and means for equiangular and equidistant displacement of said retardation means relative to said hood-over-center position in either direction.

2. The invention according to claim 1, and spring means secured to said upstanding means and a rearmost part of said hood to counterbalance the hood weight during the travel thereof past its over-center position and reciprocably moveable above said upstanding means.

3. The invention according to claim 1, said retardation means comprising a shock absorber pivotally attached to an upper portion of said upstanding means and a lower side portion of said hood.

4. The invention according to claim 3, said shock absorber being angularly disposed relative to said upstanding means in said open and closed positions.

5. The invention according to claim 2, and said stop means comprising cable means passing along said spring means and being attached to said hood and said upstanding means for limiting said hood travel into its fully open position.

6. The invention according to claim 2, said spring means comprising a tension spring disposed on each side of said upstanding means and having its attachement point to said hood essentially above a point of attachment to said upstanding means.

7. A hood tilt assist system for a motor vehicle including a supporting framework, said system comprising:

an engine covering hood pivotally mounted at its front lower portion to an immobilized part of said framework and reciprocably moveable through a hood-over-center position between open and closed positions;

travel limiting means associated with said hood and defining respectively said open and said closed positions;

upstanding means rigidly attached to and extending upwardly from said framework to a level disposed substantially above the lowest portion of said hood in both its open and closed positions;

retardation means secured to said upstanding means and said hood for reducing the speed of hood travel toward both said open and said closed positions during a segment of said hood travel disposed between said hood-over-center position and said position defined by said travel limiting means;

said retardation means providing an unrestricted displacement of said hood prior to entering said segment of said hood travel in either direction;

means for equiangular and equidistant displacement of said retardation means relative said hood-over-center position in either direction;

spring means secured to said upstanding means and a rearmost part of said hood to counterbalance the hood weight during the travel thereof past its over-center position and reciprocably moveable above said upstanding means;

said retardation means comprising a shock absorber pivotally attached to an upper portion of said upstanding means and a lower side portion of said hood.

8. A hood tilt assist system comprising:

an engine covering hood having its front lower end pivotally mounted on a vehicle framework and reciprocably moveable through a hood-over-center position between open and closed positions defined by travel limiting means operatively associated with said hood;

upstanding means rigidly secured to said framework and extending upwardly therefrom to a level above a pivotal connection between said hood and said framework;

retardation means for counterbalancing the hood weight during hood travel in either direction and reducing speed of said hood travel during a segment thereof between said hood-over-center position and said travel limited position;

said retardation means comprising a shock abosorber pivotally attached to said upstanding means and a lower side structure of said hood for cushioning said hood during its past over-center travel; and a pair of springs secured to said hood and moving above said upstanding means therewith, while urging said hood to move in a direction opposite to said travel.

9. The invention according to claim 8, and one of said springs being disposed on each side of said upstanding means.

10. The invention according to claim 8, and a portion of said travel limiting means comprising a cable limiting said hood travel at its open position and being located along each of said springs.

11. The invention according to claim 8, and said shock absorber having its lower end being moved an equal distance between a hood over-center position and its position in both said closed and said open positions.

12. The invention according to claim 8 and said shock absorber having retarding action upon being extended and no retarding action upon being compressed and said shock absorber having maximum compression at said hood-over-center position.

* * * * *